June 14, 1955  G. A. STASINOS  2,710,450
ICE CREAM BLOCK MARKING DEVICE
Filed Dec. 24, 1953

*INVENTOR.*
GEORGE A. STASINOS
BY
ATTORNEY

United States Patent Office 2,710,450
Patented June 14, 1955

2,710,450

ICE CREAM BLOCK MARKING DEVICE

George A. Stasinos, Gary, Ind.

Application December 24, 1953, Serial No. 400,206

6 Claims. (Cl. 33—1)

My invention relates to ice cream block marking devices for subdividing a large block of ice cream into smaller volumetric sections which are customarily packed in boxes and sold in stores.

An important object of my invention is to provide a device of the aforementioned character which is equipped with upper and lower frame sections, interconnected by corner posts and having secured thereto a multiplicity of wire marking elements disposed in transverse relationship.

Another object of my invention is to provide marking means for placing indicating lines on a block of ice cream or like material to facilitate subdividing same into volumetric units adapted for packaging and retail sales.

Another object of my invention is to provide a device of the aforementioned character equipped with handles to facilitate the application thereof to a block of ice cream for producing the block lines or indications hereinbefore mentioned.

A still further object of my invention is to provide an article of the aforementioned character which is simple in construction and economical to manufacture in quantity production.

Other objects and ancillary advantages inherent in my invention will become apparent from an examination of the accompanying drawings, bearing further elucidation in the ensuing description, in which.

Figure 1:
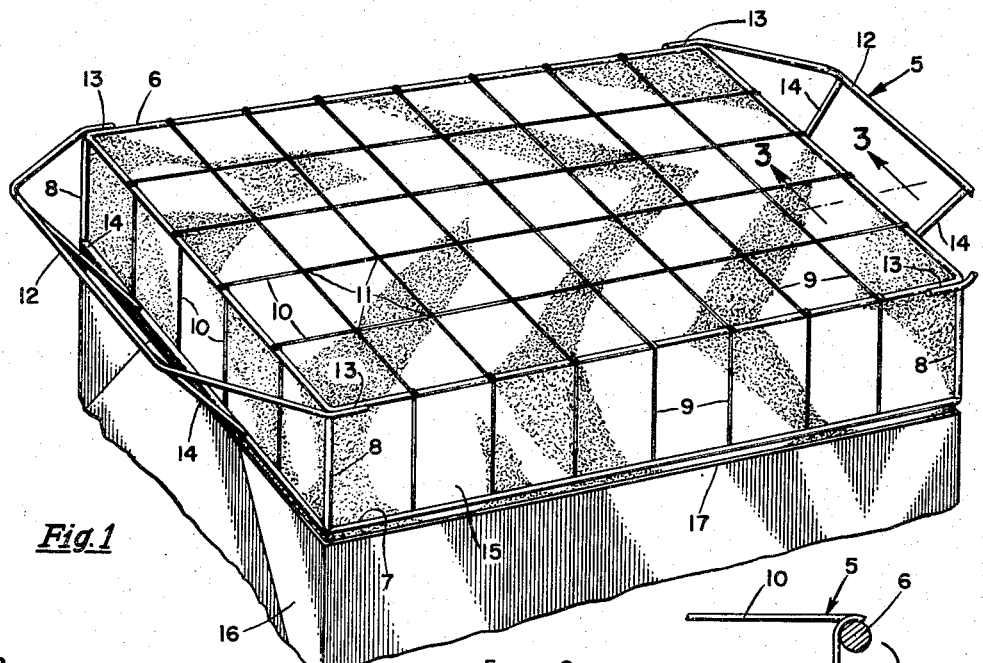
Fig. 1 is a perspective view showing my invention in position over an exposed portion of a block of ice cream, in order to provide the marking indentations thereon to act as guide lines for cutting in order to segregate individual units therefrom.
Figure 2:
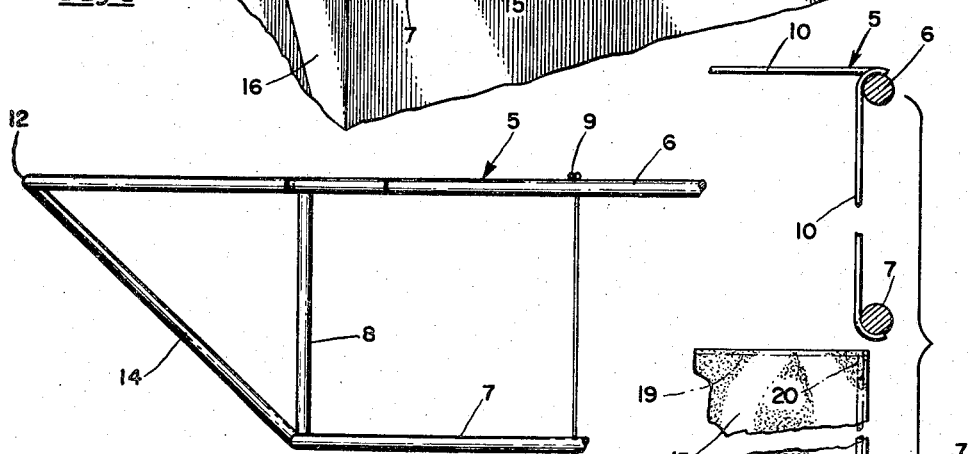
Fig. 2 is an enlarged end view of the handle structure of my invention.
Figure 3:
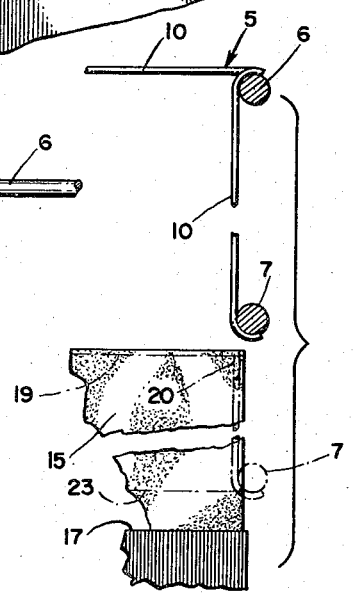
Fig. 3 is a fragmentary and cross-sectional view taken, substantially, on the lines 3—3 of Fig. 1.
Figure 4:
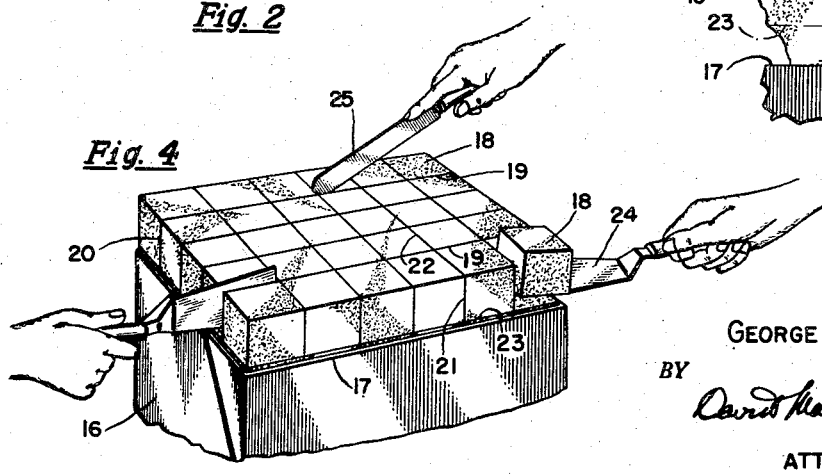
Fig. 4 is a perspective view showing the indicating lines or marking lines impressed on a block of ice cream, which will act as guide lines for cutting implements in order to sever and segregate therefrom volumetric units of equal volume.

Referring to the various views, my invention is generally designated 5 and consists of an upper wire framework 6 connected to a lower wire framework 7 by means of corner wire posts 8. To the top framework 6 are secured the handles 12 at the points 13, the handles being also reenforced by the angular struts 14 attached to the bottom framework 7, thus forming a rigid construction. A series of marking wires 9 of small diameter are fastened to the upper and lower frameworks 6 and 7 respectively, and cross wires 10 are also secured to the upper and lower frameworks, so as to provide intersecting points 11 which are preferably spot welded in order to provide a rigid construction. The marking means, generally designated 5, is placed over an exposed portion 15 of a block of ice cream sold commercially in wrappers 16 from which a portion of the wrapper has been cut away, approximately to the edge 17. The marking means 5 is grasped by the handles 12 in both hands and forced downwardly over the exposed portion 15 of a block of ice cream in order to provide the indicating lines 19, 20, 21 and 22, the lower framework also indicating the lower marking 23. A spatula 24 or a knife 25 may be employed to cut along the scored lines 19, 20, 21 and 22, also in a plane along the line 23 in order to segregate an ice cream unit 18 of definite volumetric configuration.

Similarly, other blocks 18 will be severed from the block 15 until the entire volume of the exposed block portion 15 is removed. Subsequently the paper 16 will be torn away from the block, exposing another portion equivalent in volume and dimensions to the previously exposed block portion 15, and the same operation continued until all of the ice cream has thus been subdivided and dispensed.

Thus, in utilizing my particular marking device, a block of ice cream sold commercially in large sizes may be readily and easily subdivided into retail sales units, and the same may be accomplished economically without wasting any of the product or ice cream, that is being sold.

As before stated, I have illustrated and described one exemplification of my invention, but changes as to materials used, sizes and shapes of parts, and the details of construction and operation of my invention may be made without departing from the spirit thereof.

Having thus described and revealed my invention, what I claim as new and desire to secure by Letters Patent is:

1. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, and a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream.

2. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, and a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream, the said marking wires and the said cross wires being secured by welding to the said upper framework and to the said lower framework and further being spot welded at intersecting points at the top thereof.

3. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream, and a pair of manipulating handles disposed in opposed relationship and secured to the said upper framework.

4. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream, the said marking wires and the said cross wires being secured by welding to the said upper framework and to the said lower framework and further being spot welded at intersecting points at the top thereof, and a pair of manipulating handles disposed in opposed relationship and secured to the said upper framework.

5. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream, a pair of manipulating handles disposed in opposed relationship and secured to the said upper framework, and angularly positioned struts secured to the said handles and to the said lower framework for reenforcing the same.

6. Indicating means for subdividing a block of ice cream into a multiplicity of units of like volumetric configuration, comprising an upper and lower framework arranged in spaced relationship and interconnected by wire posts at each corner thereof, a multiplicity of marking wires of inverted "U-shaped" formation secured to the said upper framework and to the said lower framework, a multiplicity of cross wires of inverted "U-shaped" formation secured to the said upper framework and to the said lower framework forming quadrilateral subdivisions at the top and four sides of the said indicating means, the interior confines of the said indicating means being of slightly lesser volume than a block of ice cream to be subdivided thereby yet the interior confines are configurative with the said block of ice cream, the said marking wires and the said cross wires being secured by welding to the said upper framework and to the said lower framework and further being spot welded at intersecting points at the top thereof, a pair of manipulating handles disposed in opposed relationship and secured to the said upper framework, and angularly positioned struts secured to the said handles and to the said lower framework for reenforcing the same.

References Cited in the file of this patent

UNITED STATES PATENTS

| | | |
|---|---|---|
| 397,475 | Tiffany | Feb. 5, 1889 |
| 423,181 | Rix | Mar. 11, 1890 |
| 699,501 | Donovan | May 6, 1902 |
| 915,935 | Carmichael et al. | Mar. 23, 1909 |
| 921,694 | Hall | May 18, 1909 |
| 1,436,236 | Cartuschka | Nov. 21, 1922 |
| 1,562,614 | Blakeslee | Nov. 24, 1925 |
| 1,626,009 | Murray | Apr. 26, 1927 |
| 2,234,129 | Pfeil | Mar. 4, 1941 |